(12) United States Patent
Perrin et al.

(10) Patent No.: US 8,812,699 B2
(45) Date of Patent: Aug. 19, 2014

(54) APPARATUS, SYSTEM, AND METHOD FOR DATA SYNCHRONIZATION IN A MULTI-PATH ENVIRONMENT

(75) Inventors: Steven Richard Perrin, Raleigh, NC (US); James Joseph Thrasher, Efland, NC (US); Michael Terrell Vanover, Raleigh, NC (US); Jennifer Greenwood Zawacki, Hillsborough, NC (US); Justin Tyler Dubs, Durham, NC (US)

(73) Assignee: Lenovo (Singapore) PTE. Ltd., Tech Park (SG)

( * ) Notice: Subject to any disclaimer, the term of this patent is extended or adjusted under 35 U.S.C. 154(b) by 824 days.

(21) Appl. No.: 12/328,126

(22) Filed: Dec. 4, 2008

(65) Prior Publication Data

US 2010/0146133 A1 Jun. 10, 2010

(51) Int. Cl.
*G06F 15/16* (2006.01)
(52) U.S. Cl.
USPC .......................... 709/229; 709/206; 709/207
(58) Field of Classification Search
USPC ......... 709/204, 205, 206, 227, 228, 229, 226, 709/248, 249
See application file for complete search history.

(56) References Cited

U.S. PATENT DOCUMENTS

| | | | | |
|---|---|---|---|---|
| 6,216,165 B1* | 4/2001 | Woltz et al. | | 709/232 |
| 6,266,785 B1* | 7/2001 | McDowell | | 714/11 |
| 6,760,753 B1* | 7/2004 | Ohgushi et al. | | 709/206 |
| 6,775,543 B2* | 8/2004 | Itazu et al. | | 455/423 |
| 7,149,813 B2* | 12/2006 | Flanagin et al. | | 709/248 |
| 7,287,097 B1* | 10/2007 | Friend et al. | | 709/248 |
| 7,289,428 B2* | 10/2007 | Chow et al. | | 370/216 |
| 7,505,974 B2* | 3/2009 | Gropper | | 1/1 |
| 7,631,021 B2* | 12/2009 | Sarma et al. | | 1/1 |
| 7,797,565 B1* | 9/2010 | Tran et al. | | 714/4.1 |
| 7,940,650 B1* | 5/2011 | Sandhir et al. | | 370/219 |
| 8,122,122 B1* | 2/2012 | Clingenpeel et al. | | 709/224 |
| 2003/0005161 A1* | 1/2003 | Chen et al. | | 709/248 |
| 2004/0049546 A1* | 3/2004 | Yoshida | | 709/206 |
| 2004/0179471 A1* | 9/2004 | Mekkittikul et al. | | 370/218 |
| 2005/0025117 A1* | 2/2005 | Inagaki et al. | | 370/350 |
| 2005/0144312 A1* | 6/2005 | Kadyk et al. | | 709/237 |
| 2005/0144452 A1* | 6/2005 | Lynch et al. | | 713/170 |

(Continued)

FOREIGN PATENT DOCUMENTS

| | | |
|---|---|---|
| CN | 1300014 | 6/2001 |
| CN | 101098313 | 1/2008 |

(Continued)

*Primary Examiner* — Dhairya A Patel
(74) *Attorney, Agent, or Firm* — Kunzler Law Group

(57) ABSTRACT

An apparatus, system, and method are disclosed for synchronizing inbound and outbound data in an environment that offers multiple data pathways. When an attempt to send data by a host computer fails, the host computer notifies a secondary device with a separate network connection of the failure. The secondary device attempts to send the data over its separate network connection. If the secondary device fails to send the data, the host computer generates new attempts to send the data over its network connection. The secondary device does the same if the host computer continues to fail in its attempts to send the data. When either the host computer or the secondary device sends the outbound data, it notifies the other of the successful send. The devices then stop further attempts to transmit the data. For inbound data, the host computer and secondary device obtain unique identifiers for inbound data items, compare them, and request from the other those inbound data items that it has not received.

20 Claims, 7 Drawing Sheets

(56) References Cited

U.S. PATENT DOCUMENTS

| | | | |
|---|---|---|---|
| 2005/0193067 A1* | 9/2005 | Ferguson | 709/206 |
| 2006/0190806 A1* | 8/2006 | Sasson et al. | 715/500 |
| 2006/0230395 A1* | 10/2006 | Paul et al. | 717/173 |
| 2007/0208803 A1* | 9/2007 | Levi et al. | 709/203 |
| 2008/0016359 A1* | 1/2008 | Godfrey et al. | 713/176 |
| 2008/0109448 A1* | 5/2008 | Aboel-Nil et al. | 707/10 |
| 2008/0208980 A1* | 8/2008 | Champan et al. | 709/206 |
| 2009/0150553 A1* | 6/2009 | Collart et al. | 709/229 |
| 2009/0234967 A1* | 9/2009 | Yu et al. | 709/232 |
| 2009/0282125 A1* | 11/2009 | Jeide et al. | 709/217 |
| 2010/0124196 A1* | 5/2010 | Bonar et al. | 370/329 |

FOREIGN PATENT DOCUMENTS

| | | |
|---|---|---|
| JP | 10-178500 | 6/1998 |
| JP | 2004-363700 | 12/2004 |
| JP | 2005-026911 | 1/2005 |
| JP | 2006-254119 | 9/2006 |

* cited by examiner

APPARATUS, SYSTEM, AND METHOD FOR DATA SYNCHRONIZATION IN A MULTI-PATH ENVIRONMENT

BACKGROUND OF THE INVENTION

1. Field of the Invention

This invention relates to maintaining properly synchronized data in an environment where data can be sent and received through separate pathways.

2. Description of the Related Art

Growth in the personal computing industry has given rise to the current day, where many people have multiple computing devices. It is not at all uncommon for a person to have a desktop computer, a laptop computer, and a mobile computing device such as a cell phone or personal digital assistant (PDA). Various computing devices fulfill different needs of the user. For example, a laptop may be a more comfortable platform for sending and typing email, but a cell phone (such as a smart phone) is often a more versatile email tool since it can use the service provider's wireless network to send and receive messages and, as a result, generally has broader availability. It is not at all uncommon for a user to have cell phone reception and corresponding email access but not have access to a network that the laptop can connect to.

The inconvenience of using a smart phone to send email is so prevalent that it has entered our cultural lexicon in the form of phrases such as "Blackberry thumb." Lenovo's Constant Connect avoids these difficulties by allowing the user to use the laptop for sending email even when it is not connected to a network; Constant Connect uses the laptop's network when it is connected to a network, and communicates data from the laptop using the cell phone's connection when the laptop cannot directly communicate with a compatible network. While this solution provides a user with the ability to use the laptop for sending and receiving data regardless of the laptop's network connection, it causes difficulty in maintaining synchronized data.

The above, of course, is simply one example a situation where synchronization problems can arise because data can travel multiple pathways to and from a source. For example, in the case of an email client on a laptop, duplication can occur if the cell phone sends the message for the laptop but the laptop sends the message itself when it is later connected to a network. Similar problems can occur that cause emails to appear multiple times in the user's inbox on the laptop. Both inbound data and outbound data can be duplicated and show up in inboxes multiple times.

Data being sent and resent multiple times can cause difficulty and frustration for a user. If duplicate emails are regularly sent and received, the annoyance of manually tracking which emails actually did or did not get sent earlier, manually cleaning duplicates out of the inbox, and repeatedly explaining why certain messages were sent twice, could prevent many users from even making use of a system offering multiple pathways. And if the data is information such as software patches and updates, receiving additional copies of executables that have already run can generate difficulties on the receiving system such as errors and failed installs. At the very least, it introduces additional down time when the computer unnecessarily installs something that has already been installed.

SUMMARY OF THE INVENTION

From the foregoing discussion, there is a need for an apparatus, system, and method that synchronizes data across multiple devices. Beneficially, such an apparatus, system, and method prevent duplication of data.

The present invention has been developed in response to the present state of the art, and in particular, in response to the problems and needs in the art that have not yet been fully solved. Accordingly, the present invention has been developed to provide an apparatus, system, and method for data synchronization that overcome many or all of the shortcomings in the art.

Disclosed is a computer readable storage medium comprising a computer readable program for data synchronization that, when executed, causes the host computer to notify a secondary device (such as a cell phone, PDA, or other network-connected device) of a failed send event on the host computer when the host computer fails to send an outbound data item over its network connection. The secondary device initiates a secondary send event for the outbound data item over a second network connection in response to receiving the notification of the failed send event. In one embodiment, the outbound data item is an email and the send event sends the email to a server. In other embodiments, the outbound data item is data such as a file or folder sent to a remote computer. The outbound data item and inbound data items can also be things such as calendar events or software updates.

The computer readable program also causes the computer to initiate a new send event for the outbound data item on the host computer if the secondary device fails to successfully send the outbound data item over its network connection. The computer also notifies the secondary device of a successful send event if the host computer successfully executes the new send event such that the outbound data item is sent over the first network connection.

The computer readable program, in certain embodiments, further causes the host computer to receive a confirmation notification from the secondary device. The secondary device sends the confirmation notification if it successfully sends the outbound data item. The secondary device is also configured to stop initiating secondary send events for the outbound data item when it receives notification of a successful send event from the host computer.

In certain embodiments, the new send event on the host computer is generated if there is a change in the state of the host computer or a change in the state of the network connection of the host computer. For example, the host computer may change states from "sleep" to "active." In certain embodiments, the host computer verifies that the secondary device failed to successfully send the outbound data item prior to initiating the new send event.

In certain embodiments, the host computer designates the outbound data item as sent by the host computer if either the host computer sends the outbound data item over the first network connection, or the secondary device sends the outbound data item over the second network connection.

In one embodiment, the secondary device is connected to the host computer through a card that is separate from and connected to the host computer. The card can be communicatively connected to the secondary device by a Bluetooth connection. In certain embodiments, the card sends data to the secondary device and receives data from the secondary device when the host computer is in a powered-down state such as s3, s4, or s5. In certain embodiments, the computer readable program is executed on the card.

In further embodiments, the host computer determines whether the secondary device has received inbound data items that the host computer has not received. If so, the host computer receives from the secondary device the inbound data items that the host computer has not received. This may be done by obtaining a set of unique identifiers for inbound data items sent to the host computer, obtaining a set of unique identifier for inbound data items sent to the secondary device over the second network connection, and receiving from the secondary device those inbound data items that have unique identifiers that are not in the set of unique identifiers for inbound data items of the host computer.

Also disclosed is an apparatus for reducing duplication of data transmissions in a multi-path environment. The apparatus includes an outbound module that notifies the secondary device of a failed send event on the host computer if the host computer fails to send an outbound data item over a first network connection. The secondary device initiates a secondary send event instructing the secondary device to send the outbound data item over a second network connection if it receives the notification of the failed send event.

The apparatus also includes a confirmation module that receives a confirmation notification from the secondary device when the secondary device successfully executes the secondary send event such that the outbound data item is sent over the second network. A retry module initiates new send events on the host computer for the outbound data item while the confirmation module lacks the confirmation notification for the outbound data item.

In addition, a synch module provides the secondary device with a success notification indicating a successful send event of the outbound email by the host computer. The secondary device stops initiating secondary send events for the outbound data item when it receives the success notification. The synch module may also designate the outbound data item as sent on the host computer in response to the confirmation module receiving the confirmation notification.

In certain embodiments, the apparatus includes an inbound module that obtains a set of unique identifiers for inbound data items sent to the host computer and compares those unique identifiers with unique identifiers for inbound data items sent to the secondary device. The apparatus then receives from the secondary device those inbound data items on the secondary device that have a unique identifier that is not in the set of unique identifiers for inbound data items of the host computer.

In certain embodiments, the retry module initiates the new send event further in response to the host computer detecting a connection to a network, entering a powered on state, and the completion of a predetermined wait time.

Also disclosed is a system of the present invention that includes a host computer that has a first network connection to a first network, and a secondary device that has a second network connection to a second network. The host computer includes a synchronization apparatus that has an outbound module, confirmation module, retry module, and synch module as described above. The secondary device includes a support apparatus that has a send module, a verification module, and a secondary retry module.

The send module generates a secondary send event for the outbound data item on the secondary device in response to receiving notification of a failed send event on the host computer from the outbound module. The verification module sends the confirmation notification to the host computer when the secondary device successfully sends the outbound data item over the second network. The secondary retry module resends the outbound data item on the secondary device when the secondary send event fails and when the secondary device has not received the success notification.

In one embodiment, the retry module continues resending the outbound data item until either the host computer successfully sends the outbound data item or the confirmation module receiving the confirmation notification indicating that the secondary device has successfully sent the outbound data item.

In one embodiment, the outbound module detects a send event of a mail user agent operating on a host computer that instructs the host computer to send an outbound email. The outbound module copies the outbound email to the secondary device via a communications connection such as Bluetooth. The outbound module then monitors for transmission events indicating that the send event of the outbound email on the host computer is either failed or delayed. The outbound module sends the secondary device a transmit request in response to the occurrence of a transmission event. The secondary device then attempts to send the outbound email in response to receiving the transmit request.

In such an embodiment, the retry module can be configured to initiate a new send event in the mail user agent for the outbound email on the host computer while the confirmation module lacks the confirmation notification for the outbound email. The synch module can be configured to provide the secondary device with a success notification indicating a successful send event of the outbound email by the host computer, and the secondary device deletes the outbound email from a send queue in response to receiving the success notification.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention provides a solution to ensure improved data synchronization where multiple data paths are available to a single host. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs when executed by a computer system may perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Modules may, for example, be stored in computer-readable storage media. Such media encompasses any medium that a computer can read and from which it can extract instructions and data for execution on a processor. Examples include, but are not limited to, CDs, DVDs, hard drives, magnetic media, optical media, solid state memory, and others known to those in the art.

Figure 1:
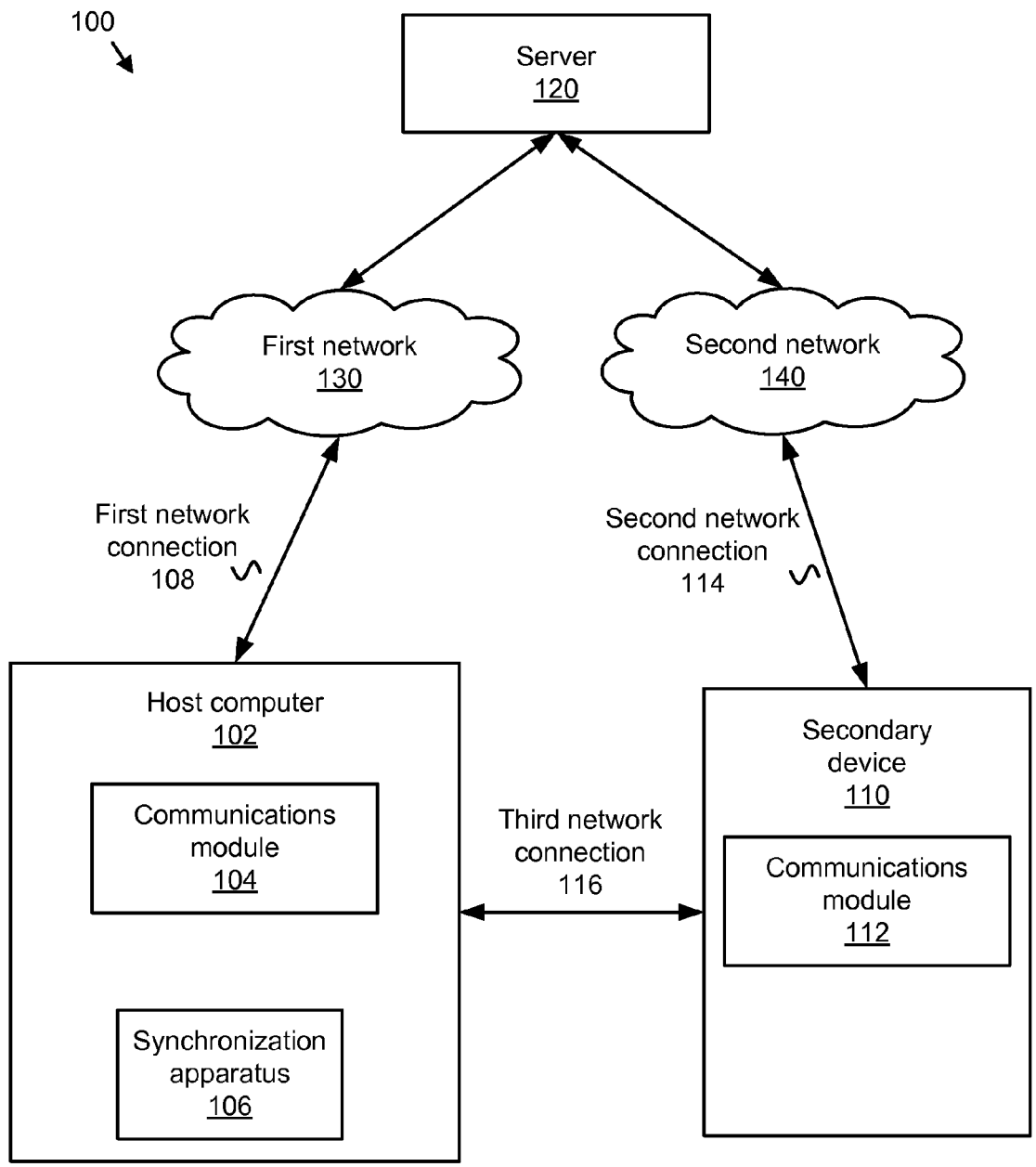
FIG. 1 is a schematic block diagram illustrating one embodiment of a system for sending and receiving data utilizing the present invention.

FIG. 1 shows a system 100 that includes a server 120, a host computer 102, and a secondary device 110. As depicted, the host computer 102 is communicatively connected to the server 120 by the first network 130. The host computer 102 is connected to the first network 130 by a first network connection 108. The secondary device 110 is connected to the server by a second network 140. The secondary device 110 is connected to the second network 140 by a second network connection 114. The first network connection 108 and second network connection 114 can be wired network connections (such as Ethernet) or wireless connections made by a wireless card. The host computer 102 and the secondary device 110 are connected by a third network connection 116. Again, the third network connection 116 may be a wired network connection or a wireless connection such as Bluetooth.

In certain embodiments, the secondary device 110 and host computer 102 are connected to the same network (for example, the first network 130) but are connected by separate network connections such as the first network connection 108 and the second network connection 114. For example, the host computer 102 may have an Ethernet connection to the first network 130, while the secondary device 110 has a wireless connection to the first network 130. In other embodiments, the host computer 102 and secondary device 110 are connected to separate networks such as the first network 130 and the second network 140. For example, the host computer 102 may be connected to the server 120 through a first network 130 that is managed by a cable or DSL provider, while the secondary device 110 is connected to the server 120 through a second network 140 that is managed by a national wireless service provider such as a cell phone company. The host computer 102 and the secondary device 110 each have a separate physical device for making the first network connection 108 and the second network connection 114. The network connections are made through separate hardware (e.g., the host computer 102 and the secondary device 110 do not share the same wireless card or Ethernet port).

The host computer 102 can also be a desktop computer, a personal digital assistant (PDA), a laptop, or other electronic device that can communicate data over a network connection to the server 120. The secondary device 110 can also be a computer, PDA, a cell phone, or other device that can communicate data through a network connection to the server 120. The host computer 102 and secondary device 110 have separate physical connections to the server 120 even when they use the same network. For example, the host computer 102 may communicate over a wireless network connection to the first network 130, and the secondary device 110 also communicates over the same wireless network.

In certain embodiments, the host computer 102 and the secondary device 110 are physically incorporated into the same form factor. In such embodiments, the secondary device 110 could connect directly to the motherboard of the host computer 102 by a third network connection 116 that is PCI express. In other embodiments, the secondary device 110 is a card that connects to host computer via well-known communications protocols such as USB. In yet other embodiments, the secondary device 110 is separate from the host computer 102 and provides a multitude of functions, including the functionality described in this application. For example, a cell phone may connect to the host computer 102 using a network connection 116 that is a Bluetooth connection. In each embodiment, however, the secondary device 110 provides a separate physical network connection (second network connection 114) than that provided by the host computer 102 (first network connection 108).

The host computer 102 also includes a communications module 104 that allows the host computer 102 to communicate information over a network. The host computer 102 uses the communications module 104 to send information and receive information over the first network connection 108. The secondary device 110 similarly has a communications module 112 that it uses to send information and receive information over the second network connection 114.

In accordance with the present invention, the host computer 102 includes a synchronization apparatus 106 described in greater detail below. The synchronization apparatus 106 facilitates data communication between the host computer 102 and the server 120 via multiple pathways. For example, if the host computer 102 loses the first network connection 108 such that it cannot communicate with the server 120, the synchronization apparatus 106 facilitates sending and receiving data over the secondary device 1 10. When both the host computer 102 and the secondary device 110 are in communication with the server 120, the synchronization apparatus 106 coordinates communications such that the host computer 102 and the secondary device 110 do not send and receive duplicate data. In addition, the synchronization apparatus 106 ensure that incoming and outgoing data is routed through the first available network connection in the event that both the first network connection 108 and the second network connection 114 are down for a period of time.

Figure 2:
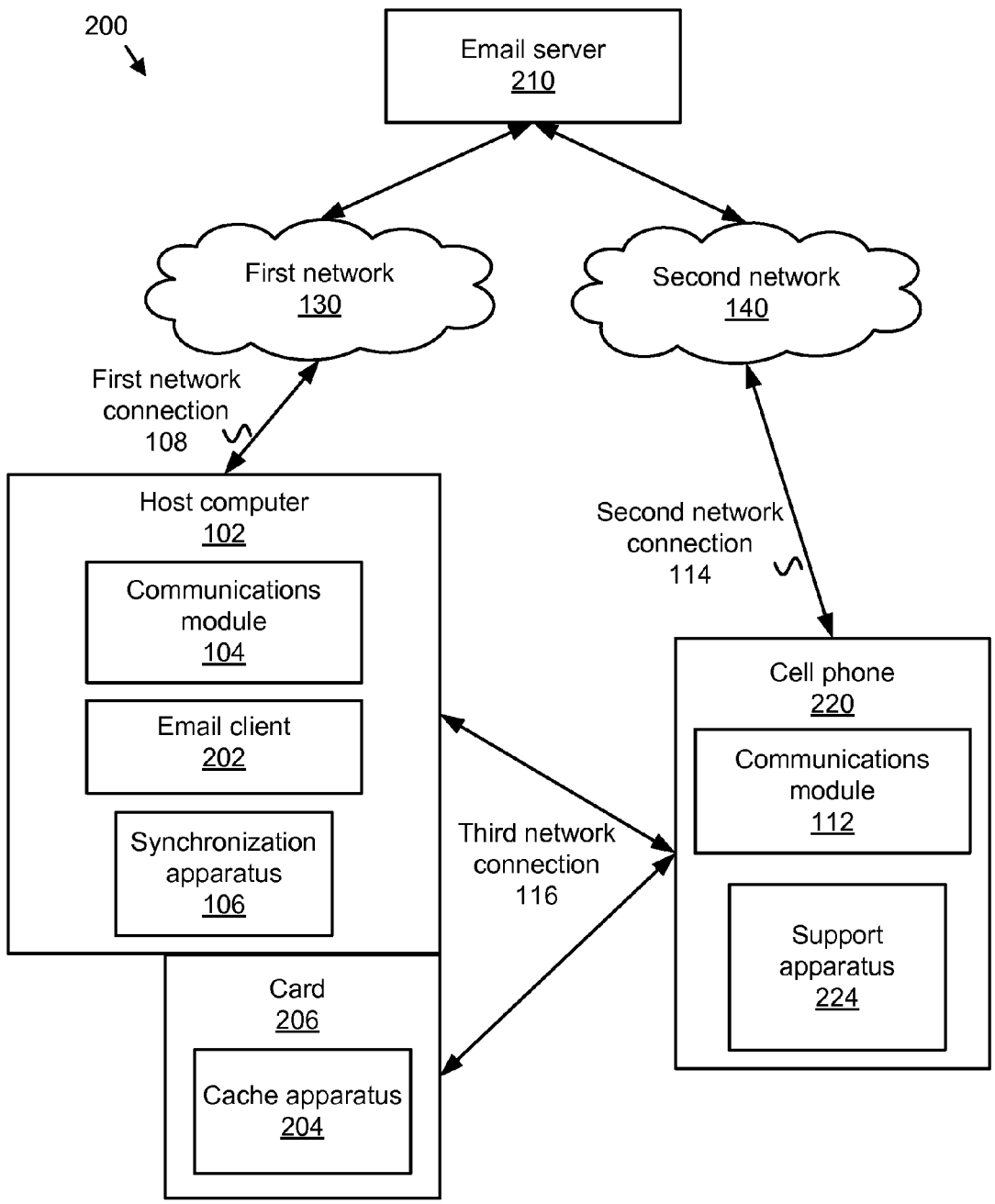
FIG. 2 is a schematic block diagram illustrating an additional embodiment of a system for sending and receiving data utilizing the present invention.

FIG. 2 shows one example of a system 200 that may benefit from a synchronization apparatus 106 in accordance with the present invention. The described embodiment, however, is simply one example of a system 200 that may benefit from the present invention. The present invention is not limited email as described in the present invention.

In the system 200, the server 120 is an email server 210, also referred to as a mail transfer agent (MTA). The email server 210 receives email for users and coordinates sending emails from users to other accounts. When the email server 210 receives an email message, it transfers the email message to the host computer 102 running the email client 202. The email server 210 may be a SMTP server, POP3 server, IMAP server, or a combination of the above. The operations of an email server 210 are tangential to the present application; as such, they are not described in detail. Of particular import is that the email server 210 communicates inbound email messages to the email client 202 running on the host computer 102, and receives outbound email messages from the email client 202. Communications between the host computer 102 and the email server 210 occur over the first network 130 in the depicted embodiment. The email server 210 may be, for example, a Microsoft Exchange server, sendmail, Postfix, Exim, or other known in the art. In other embodiments, the email server 210 may be a webmail service such as hotmail, gmail, or other.

The host computer 102 includes an email client 202 and a synchronization apparatus 106. The email client 202 (also known as a mail user agent (MUA)) provides an interface with the user of the host computer 102 who is sending and receiving email. Examples of email clients 202 are Microsoft Outlook, Groupwise, Eudora, Apple Mail, or others known in the art. The email client 202, in a preferred embodiment, offers offline capability such that the user can read, access, and compose email regardless of the status of the first network connection 108.

Also shown in the system 200 is a cell phone 220 including a communications module 112 and a support apparatus 224. In one embodiment, the cell phone 220 is a Research in Motion (RIM) blackberry cell phone 220. The cell phone 220, however, may be any brand that provides data communications in addition to voice communications over a second network 140. The cell phone 224 also includes a support apparatus 224 in accordance with the present invention.

A user can also send and receive email using the cell phone 220. In one embodiment, the cell phone 220 receives inbound email from the email server 210 over the second network 140 and sends outbound email to the email server 210 over the second network 140. In certain embodiments, the second network 140 may require additional elements to support such communication. For example, a Blackberry Enterprise server may be used to facilitate communicating email to and from the cell phone 220. The cell phone 220 may also implement its own email client (not shown) to help the user easily compose and receive email messages. The email client on the cell phone 220 may also have offline capability.

The cell phone 220 and the host computer 102 also communicate information via the third network connection 116. In one embodiment, the third network connection 116 is a Bluetooth connection. The communications module 112 of the cell phone 220 and the communications module 104 of the host computer 102 are configured to enable sharing data between the cell phone 220 and the host computer 102. In one embodiment, the cell phone 220 has a Bluetooth serial port connection that establishes what appears as a serial port on the host computer 102. Data is then passed to and from the host computer 102 and cell phone 220 over the Bluetooth serial port connection.

In one embodiment, when a user composes an email and sends the email using the email client 202, the synchronization apparatus 106 detects the send event generated by the email client 202 when the user hits the send button on the email client 202. The send event instructs the host computer 102 to send the outbound email over the first network connection 108 that connects the host computer 102 with the email server via the first network 130.

In one embodiment, the synchronization apparatus 204, upon detecting the send event, copies the outbound email to the cell phone 220 via the third network connection 116. The synchronization apparatus 204 then monitors for transmission events on the host computer 102 that indicate that the outbound email has either failed or been delayed. For example, if the host computer 102 is not connected to a network, a transmission event may indicate that the email could not be sent because there is no network connection connecting the host computer 102 to the email server 120. Or, if the host computer 102 is put to sleep prior to the email being sent, or there is a failure of some sort preventing the email from being sent, a transmission event is generated indicating this failure or delay.

In one embodiment, if the synchronization apparatus 106 detects a transmission event, it sends the cell phone 220 a transmit request that directs the cell phone 220 to send the outbound email over the second network connection 114 and to the email server 210. As a result, the user can send an email using the host computer 102 even if the first network connection 108 is not putting the host computer 102 in communication with the email server 210. If the host computer 102 is disconnected, or there is a problem with either the first network 130 or the first network connection 108, the user can still use the host computer 102 to send email. As described above, the email is redirected to the cell phone 220 in the event that there is a transmission event indicating that the send event is failed or delayed.

In one embodiment, the synchronization apparatus 106 receives a confirmation notification from the support apparatus 224 on the cell phone 220 if the cell phone 220 successfully sends the outbound email as directed by the transmit request. The synchronization apparatus 106 then instructs the email client 202 not to make further attempts at sending the outbound email. In one embodiment, upon receipt of the confirmation notification, the synchronization apparatus 106 marks the particular email as sent and moves it from a pending state to a sent state. The synchronization apparatus 106 may include a plug-in component for the email client 202 in order to enable this functionality.

As a result, once the outbound email is sent by the cell phone 220, the successful send is documented on the host computer 102. The synchronization apparatus 106 then ensures that the successful send is documented by the email client 202 so that it does not send the email again once a connection via the first network connection 108 is established. As a result, the outbound email can be composed and sent on the host computer 102, even if it is not connected to a network. The synchronization apparatus 106 works to send the outbound email over the second network connection 114 in a manner that is transparent to the user. The synchronization apparatus 106 also ensures that duplicates of outbound emails are not sent over the two separate communication paths by marking the outbound email as sent on the host computer 102 even if it has not been sent over the host computer 102's first network connection 108.

However, the cell phone 220 may not have a connection to the email server 210 either. The cell phone 220 thus cannot send the outbound email over the second network connection 114. In order to make sure that the outbound email gets sent as quickly as possible, the synchronization apparatus 106, in certain embodiments, facilitates having the host computer 102 attempt to send the outbound email so long as it has not been told that the cell phone 220 has successfully sent the outbound email. In one embodiment, the synchronization apparatus 106 causes the email client 202 to initiate a new send event for the outbound email on the host computer 102 so long the synchronization apparatus 106 has not received the confirmation notification that indicates that the email has been sent. The synchronization apparatus 106 may cause the email client 202 to perform this at regular intervals. In addition, the synchronization apparatus 106 may allow the email client 202 to engage in regular resend attempts according to its own rules. For example, the email client 202 may attempt to send an outbound email when the host computer 102 detects that it is connected to a network via the first network connection 108.

If the host computer 102 successfully sends the outbound email, the synchronization apparatus 106 provides the cell phone 220 with a success notification that indicates that there has been a successful send event for the outbound email on the host computer 102. The support apparatus 224 deletes the outbound email from the send queue in the cell phone 220 upon receiving the success notification. Again, this ensures that the cell phone 220 does not send a duplicate email if the host computer 102 successfully sends the outbound email.

For example, in one embodiment, once the user hits the send button on the email client 202, the synchronization apparatus 106 copies the outbound email to the cell phone 220 as described above. If the host computer 102 successfully sends the email, the synchronization apparatus 106 instructs the cell phone 220 to delete the copy of the outbound email. If the host computer 102 fails to successfully send the outbound email, the cell phone 220 attempts to send the outbound email over the second network connection 114. At this point, the host computer 102 and cell phone 220 continue attempts to send the outbound email. When one device successfully sends the outbound email, it notifies the other. At this point, all further attempts to send the outbound email are stopped and the outbound email is marked as sent on the host computer 102. The email may also be marked as sent on the cell phone 220.

In one embodiment, the cell phone 220, rather than wait for a transmit request from the host computer 102, simply waits for a predetermined period after receiving a copy of the outbound email. If the cell phone 220 does not receive a notification from the host computer 102 during that time indicating that the outbound email has been sent, the cell phone 220 starts attempts to send the outbound email over the second network connection 114. Thus, in one embodiment, the cell phone 220 assumes that the outbound email was not successfully sent after a period of time unless it is told otherwise by the synchronization apparatus 106.

The synchronization apparatus 106 also facilitates receiving inbound emails over multiple paths without duplication. In one embodiment, the synchronization apparatus 106 derives a unique identifier for every inbound email sent to the host computer 102 over the first network connection 108. For example, the synchronization apparatus 106 may use the day/time/sent mail header as the unique identifier. The synchronization apparatus 106 could also use this in combination with other information such as sender, subject, or some combination of them, in order to uniquely identify inbound emails received over the first network connection 108. Those in the art will appreciate the various ways in which an email may be uniquely identified.

The synchronization apparatus 106 compares the set of unique identifiers of the inbound emails received over the first network connection 108 with the unique identifiers of inbound emails received by the cell phone 220 over the second network connection 114. In one embodiment, the support apparatus 224 provides the unique identifiers for the inbound emails received by the cell phone 220. By comparing the two sets of unique identifiers, the synchronization apparatus 106 determines which inbound emails have been received by the cell phone 220 that have not been received by the host computer 102. The synchronization apparatus 106 then receives those inbound emails that the cell phone 220 has received but which the host computer 102 has not.

In one embodiment, the synchronization apparatus 106 causes these inbound emails received by the cell phone 220 to appear in the email client 202 as if they were received over the first network connection 108. In certain embodiments, the inbound emails received by the cell phone 220 are a simplified version of what is actually on the email server 210. Sending such a simplified version may conserve bandwidth on the second network 140. In such embodiments, the synchronization apparatus 106 may cause the version of the inbound email received from the cell phone 220 to be replaced with the one received over the first network connection 108 when the inbound email actually arrives over the first network connection 108.

As a result, the present invention allows a user to email using the host computer 102 regardless of the connection status of the first network connection 108. Both inbound and outbound emails are received and sent over the first available network connection. In addition, the synchronization apparatus 106 reduces occurrences of duplication that would occur given the two separate data paths to and from the email server 210.

FIG. 2 also shows a card 206 with a cache apparatus 204. The card 206 may be used to extend the versatility of the presented email solution. In certain embodiments, where the synchronization apparatus 106 operates in conjunction with the host computer 102, the synchronization apparatus 106 is only functional when the host computer 102 is operational. In certain embodiments, this condition is referred to as "s0." Where the host computer 102 is in suspend, hibernate, or soft off (s3, s4, and s5 respectively) the synchronization apparatus 106 is unavailable and does not provide the functionality described. Nor does the host computer 102 maintain the third network connection 116 in such a state.

The card 206 is preferably configured to operate independently of the host computer 102. The card 206 thus maintains power even when the host computer 102 is unavailable. In certain embodiments, the card 206 also includes its own processor and memory and runs its own separate operating system such that it can function independently of the host computer 102.

When the host computer 102 is available, the synchronization apparatus 106 also writes the information sent to the cell phone 220 to the card 206. In one embodiment, the cache apparatus 204 stores only those emails that are affected by the synchronization apparatus 106; that is, the cache apparatus 204 does not replicate the entire mailbox of the email client 202. Only those emails that are being sent or received as described above are stored to the cache apparatus 204. Once synchronization is complete, the emails are deleted from the cache apparatus 204. Thus, information sent to and received from the cell phone 220 is also stored in the cache apparatus 204. In one embodiment, when the host computer 102 is available, the cell phone 220 communicates directly with the host computer 102.

When the host computer 102 is unavailable (as it is when in s3, s4, s5), the cell phone 220 communicates information with the card 206 via the third network connection 116. Thus, any connection with the host computer 102 is terminated and a connection with the card 206 is established. Because the card 206 remains available, the cell phone 220 can continue to write information to the card 206. Thus, the notifications described above can be sent to the card 206 and stored in the cache apparatus 204. When the host computer 102 comes back online, the synchronization apparatus 106 can quickly determine the status of sent and received emails by extracting that information from the card 206.

In one embodiment, the synchronization apparatus 106 operates on the card 206 instead of the host computer 102. In other embodiments, the card 206 is configured to provide the cache apparatus 204 and also be the secondary device 110. For example, the card 206 could be configured with a wireless network connection such that it can effectively take the place of the cell phone 220 in the depicted embodiment. Alternatively, the card 206 could be used as another connection path to the email server 210.

In certain embodiments of the system 200, the host computer 102 does not have an attached card 206. The synchronization apparatus 106 still provides the services described above; however, communications and synchronization information cannot be shared while the host computer 102 is unavailable in such embodiments.

Figure 3:
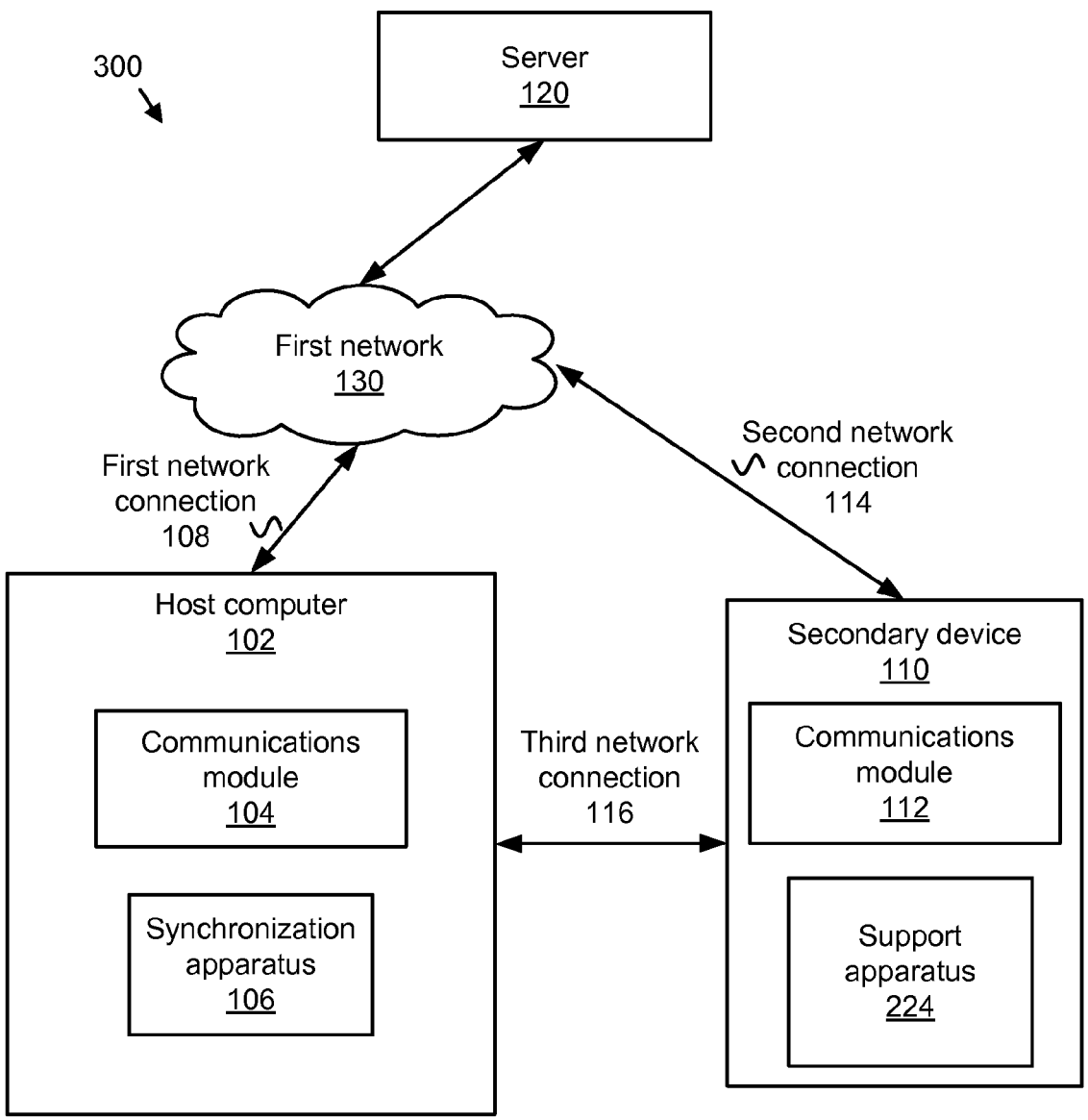
FIG. 3 is a schematic block diagram illustrating a third embodiment of a system for sending and receiving data utilizing the present invention.

FIG. 3 shows a system 300 in which the host computer 102 and the secondary device 110 are both connected to the server 120 by the first network 130. However, the host computer 102 is connected by a first network connection 108 and the secondary device 100 is connected by a second network connection 114. For example, the first network connection 108 may be an Ethernet connection while the second network connection 114 is a wireless connection.

While such an embodiment may not provide the same scope of protection provided by a system that allows the host computer 102 and the secondary device 110 to communicate over separate networks, the depicted embodiment may still be useful. For example, problems in the host computer 102 that prevent data from being sent over the first network connection 108 may be circumvented by allowing data to travel over the second network connection 114. The system 300 still provides increased reliability and robust data communication.

Figure 4:
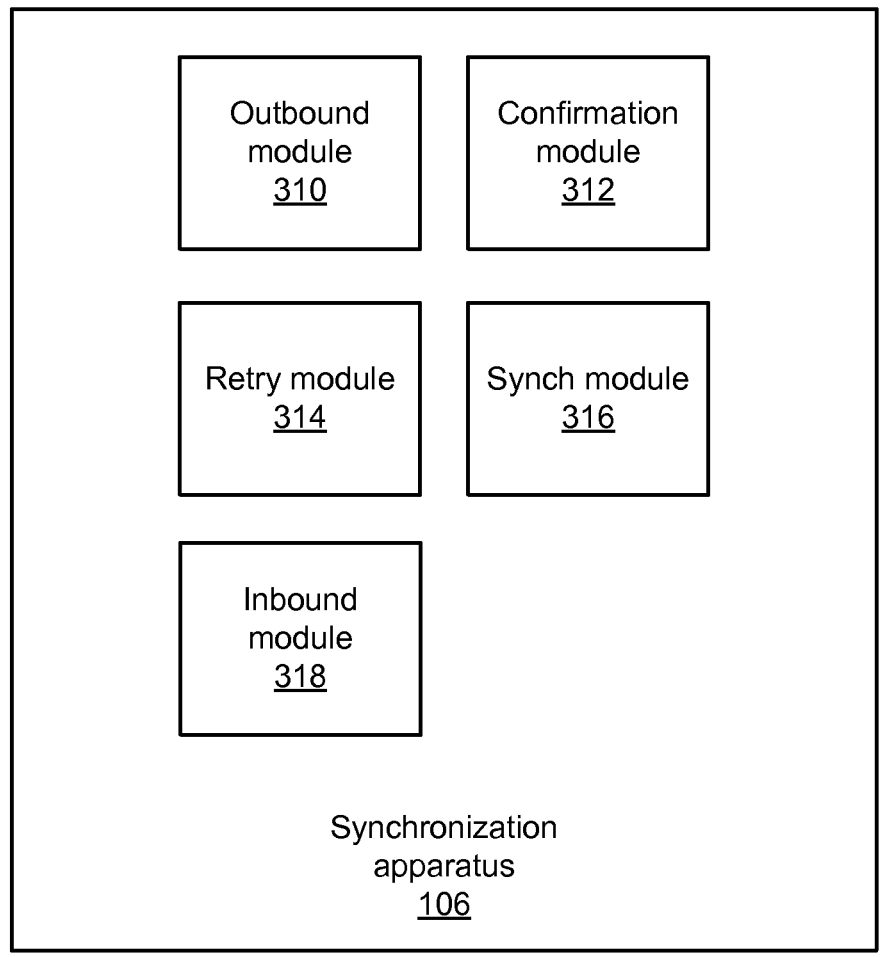
FIG. 4 is a schematic block diagram illustrating one embodiment of a synchronization apparatus of the present invention.

FIG. 4 illustrates one embodiment of a synchronization apparatus 106 in accordance with the present invention. In the depicted embodiment, the synchronization apparatus 106 includes an outbound module 310, a confirmation module 312, a retry module 314, and a synch module 316.

The outbound module 310 notifies the secondary device 110 of a failed send event if the host computer 102 fails to send an outbound data item over the first network connection 108. The secondary device 110 initiates a secondary send event on the secondary device 110 when it receives notification of a failed send event. The secondary device 110 thus attempts to send the outbound data item over the second network connection 114.

In one embodiment, notifying the secondary device 110 involves providing the secondary device 110 with an affirmative notification directing the secondary device 110 to send the outbound data item. In other embodiments, notifying the secondary device 110 involves providing the secondary device 110 with a copy of the outbound data item and not providing a designation that the email is sent on the host computer 102. For example, the outbound module 310 may provide the secondary device 110 with a copy of the outbound data item. The secondary device 110 may be configured to start attempting to send the outbound data item if it has not received a confirmation that the outbound data item was sent by the host computer 102 within a prescribed period. Notifying the secondary device 110 of a failed send event thus includes such an embodiment of negative affirmance; i.e., where failure is presumed in the absence of notification to the contrary.

In another embodiment, notifying the secondary device 110 involves detecting a send event on the host computer 102 and copying the outbound data item to the secondary device 110 over the third network connection 116. The outbound module 310, in such an embodiment, may also be configured to monitor for transmission events that indicate that the send event for the outbound data item on the host has either failed or is delayed. Transmission events may be generated either by the operating system on the host computer 102 or by applications running on the host computer 102.

In one embodiment, if the outbound module 310 detects a transmission event, it sends the secondary device 110 a transmit request. The secondary device 110 is configured to send the copy of the outbound data item over the second network connection 114 if the secondary device receives the transmit request from the outbound module 310.

In one embodiment, the synchronization apparatus 106 also includes a confirmation module 312. The confirmation module 312 is configured to receive a confirmation notification from the secondary device 110 when the secondary device 110 successfully sends the outbound data item over the second network connection 114. The confirmation notification can be a flag, a message (such as XML), a change in the status of the outbound data item (i.e., changing the status from unsent to sent), or other notification indicating that the outbound data item has been sent by the secondary device 110.

In one embodiment, the synchronization apparatus 106 also includes a retry module 314. The retry module 314 initiates a new send event on the host computer 102 for the outbound data item the confirmation module 312 lacks a confirmation notification for the outbound data item sent by the secondary device 110, which confirmation notification indicates that the outbound data item has been sent. The retry module 314 may instruct the host computer 102 to initiate new send events at regular intervals so long as the confirmation module 312 has not received the confirmation notification. The retry module 314 alternatively, may instruct the host computer 102 to initiate new send events in response to the host computer 102 detecting a change in network setting (i.e., if the host computer 1 10 detects that it has been connected to a network via the first network connection 108) or a change in the host computer 102's status (i.e., the host computer 102 changes from s3, s4, or s5 to s0).

The synchronization apparatus 106 may also include a synch module 316 that provides the secondary device 110 with a success notification that indicates that the host computer 102 has successfully executed a send event for the outbound data item. The secondary device 110 is configured to stop initiating secondary send events for the outbound data item when it receives the success notification from the synch module 316.

The synch module 316 can also be configured to designate the outbound data item as sent on the host computer if the confirmation module 312 receives the confirmation notification as described above. For example, where the outbound data item is an email, the synch module 316 may direct the email client 202 to move the outbound email from a "pending" folder to the "sent" folder. As a result, the user knows that the outbound email has been sent. However, the mechanics of how the outbound email was sent (i.e., by the secondary device 110) is hidden from the user. In one embodiment, the synch module 316 writes information to the outbound email metadata indicating that it was sent by the secondary device 110.

In one embodiment, the success notification and the confirmation notification indicate only that the outbound data item has been successfully sent by the relevant device, whether the host computer 102 or the secondary device 110. The notifications need not indicate that the outbound data item is successfully transmitted to the server 120.

In one embodiment, the synchronization apparatus 106 also includes an inbound module 318 that manages receipt and synchronization of inbound data items. In one embodiment, the inbound module 318 obtains a set of unique identifiers for inbound data items sent to the host computer 102. The inbound module 318 compares the set of unique identifiers for the inbound data items sent to the host computer 102 with unique identifiers for inbound data items sent to the secondary device 110.

Through the comparison, the inbound module 318 determines which inbound data items have been received by the secondary device 110 but have not been received by the host computer 102. The inbound module 318 receives from the secondary device 110 those inbound data items that have not been received by the host computer 102. In one embodiment, those inbound data items received from the secondary device 110 are flagged or otherwise marked for replacement when the host computer 102 is able to connect to the server 120 over the first network connection 108.

The synchronization apparatus 106 thus operates to provide multiple routes for sending outbound data items and receiving inbound data items while ensuring that the outbound and inbound data items are not duplicated. As a result, the synchronization apparatus 106 provides a more robust, versatile, and valuable solution to consumers, particularly those who are constantly on the move.

Figure 5:
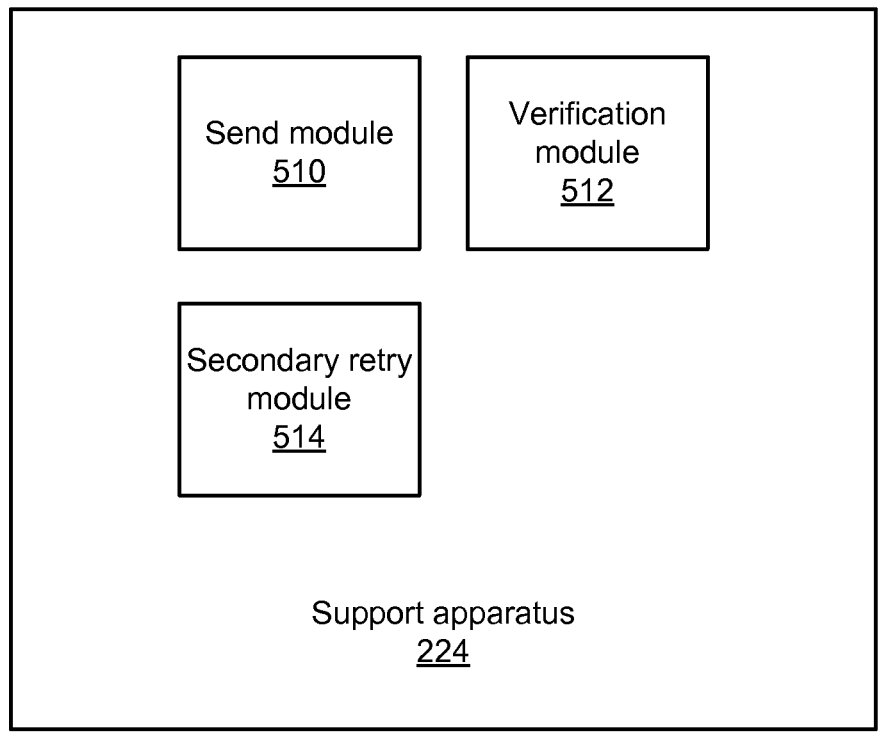
FIG. 5 is a schematic block diagram illustrating one embodiment of a support apparatus of the present invention.

FIG. 5 illustrates one embodiment of a support apparatus 224 in accordance with the present invention. The support apparatus 224 is implemented on the secondary device 110 and coordinates with the synchronization apparatus 106 to provide a robust data transmission system with minimal risk of data duplication. The support apparatus 224 includes a send module 510, verification module 512, and secondary retry module 514.

The send module 510 is configured to send the outbound data item over the second network connection 114 of the secondary device 110 when the outbound module 310 of the synchronization apparatus 106 provides notification of a failed send event on the host computer 110. In one embodiment, the send module 510 generates a secondary send event that invokes the functionality provided by the communications module 112 of the secondary device 110 to send the outbound data item. Thus, if the outbound data item is not sent over the first network connection 108, the synchronization apparatus 106 and support apparatus 224 work together to send the outbound data item over the second network connection 114.

As discussed above, the confirmation module 312 of the synchronization apparatus 106 receives a confirmation notification when the secondary device 110 successfully sends the outbound data item. The verification module 512 sends this confirmation notification to the confirmation module 312 when the secondary device 110 successfully sends the outbound data item over the second network connection 114. In one embodiment, the verification module 512 sends the confirmation notification in response to the send module 510 generating a send event for the outbound data item that is successfully executed.

The secondary retry module 514 resends the outbound data item on the secondary device 110 if the secondary send event generated by the send module 510 fails. In one embodiment, the secondary retry module 514 generates a new secondary send event for the outbound data item. The secondary retry module 514 may generate new secondary send events at a particular interval after the secondary send event fails, when the secondary device 110 reports a change to its network status, a change in the state of the secondary device 110, or some combination of the above. Events other than those mentioned above may also be used in determining when to generate a new secondary send event, and the present invention is not limited to any particular events used to generate new secondary send events.

It was noted above that the synch module 316 provides the secondary device 110 with a success notification when the synchronization apparatus 106 successfully sends the outbound data item. In one embodiment, the secondary retry module 514 verifies that the secondary device 110 has not received the success notification prior to generating a new secondary send event. The secondary retry module 514 may simply check to see if the success notification has been sent, may poll the synchronization apparatus 106 for the success notification, or a combination of the two. Verifying that the synchronization apparatus 106 has not sent the outbound data item over the first network connection 108 prior to generating a new secondary send event helps ensure a reduction in data duplication.

Figure 6:
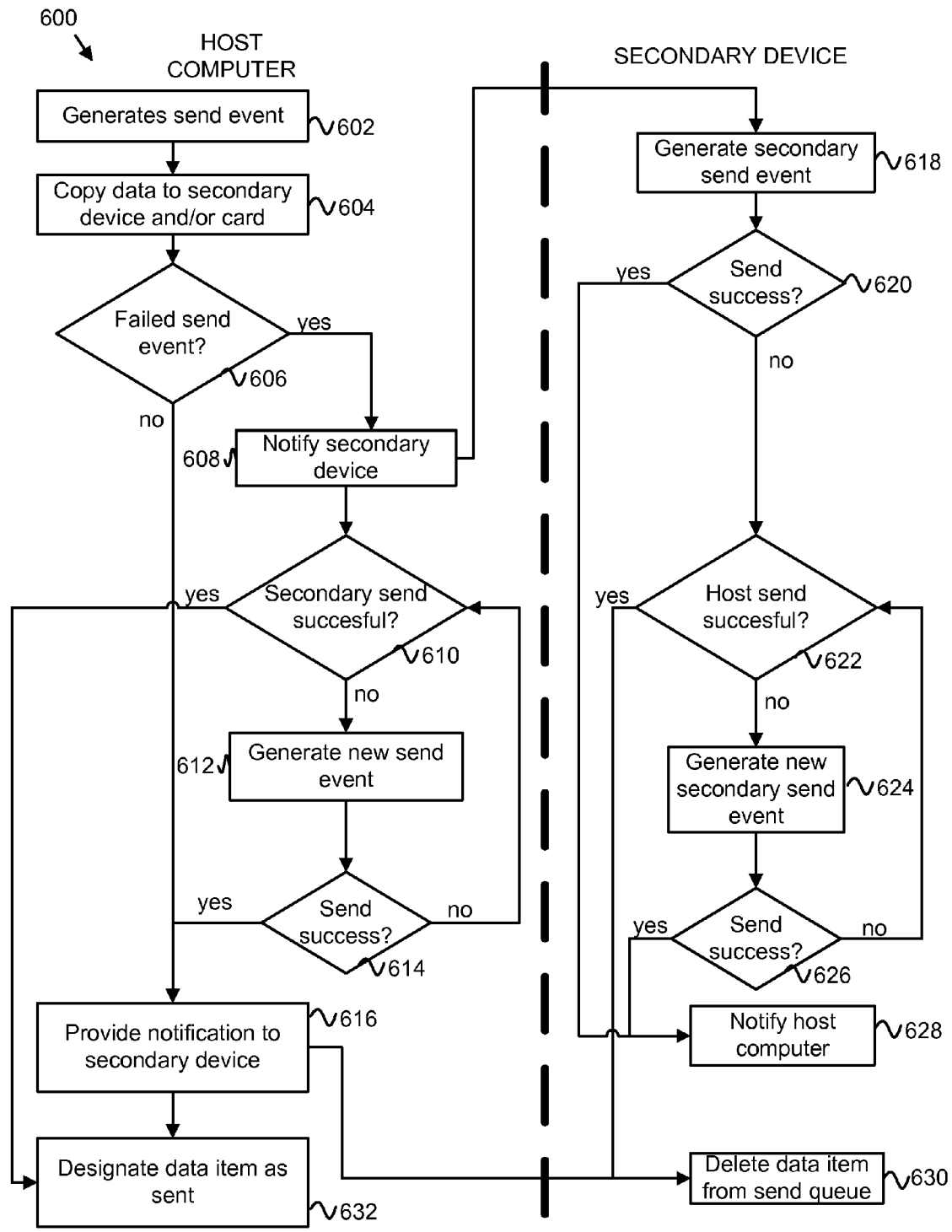
FIG. 6 is a schematic flow chart diagram illustrating one embodiment of a method for outbound data synchronization in accordance with the present invention.

FIG. 6 is an exemplary flow chart diagram showing one embodiment of a method 600 for providing a high-availability data communication system with low risk of unintended data duplication. The left side of the flow chart represents activity on the host computer 102 and the right side represents activity on the secondary device 110. The method 600 begins with generating 602 a send event on the host computer 602. In one embodiment, a user generates the send event by inputting a send command on the host computer 102 that instructs the host computer 102 to send the outbound data item over the first network connection 108. In another embodiment, the host computer 102 or an application running on the host computer 102 generates the send event for the outbound data item without receiving user input. For example, the host computer 102 may be configured to automatically generate a report and send that report to a server 120 at particular intervals.

After the send event is generated, the outbound module 310 copies 604 the outbound data item to the secondary device 110. The outbound module 310 may also copy the outbound data item to the card 206 as described above. In other embodiments, the outbound module 310 copies the outbound data item to the secondary device 110 and card 206 before the send event is generated.

In one embodiment, the outbound module 310 monitors the host computer 102 and determines 606 whether the send event fails or succeeds. The outbound module 310 may monitor the host computer 102 for transmission events indicating that the send event for the outbound data item either failed or was unable to execute. If the send event for the outbound data item successfully executes, the synch module 316 provides 616 a success notification to the secondary device 110. The synch module 316 may further designate 632 the outbound data item as sent on the host computer 102. In response, the send module 510 on the secondary device 110 deletes 630 the data item from the send queue on the secondary device 110.

However, if the send event fails, the outbound module 310 notifies 608 the secondary device 110 that the send event failed. In one embodiment, the outbound module 310 provides a notification to the send module 510 on the secondary device 110. In response, the send module 510 generates 618 a secondary send event on the secondary device 110. The secondary send event directs the secondary device 110 to send the outbound data item over the second network connection 114.

In one embodiment, the verification module 512 determines 620 whether the secondary send event was successful. If the secondary send event was successful, the verification module 512 notifies 628 the host computer 102. The confirmation module 312 receives the confirmation notification provided by the verification module 512 when the secondary device 110 successfully executes the secondary send event. In response, the confirmation module 312 determines 610 that the secondary send event was successful and the synch module 316 designates 632 the data item as sent.

If the secondary send event was unsuccessful, the secondary device 110 continues attempts to send the outbound data item over the second network connection 114. In one embodiment, prior to each attempt, the secondary retry module 514 determines 622 whether the host computer 102 has successfully sent the outbound data item over the first network connection 108. The secondary retry module 514 may make the determination by checking whether the synch module 316 has sent a success notification indicating that the outbound data item has been successfully sent on the host computer 102. The secondary retry module 514 may alternatively poll the host computer 102 and request a status update for the outbound data item prior to each new send attempt.

If the host computer 102 has successfully sent the outbound data item, the send module 510 on the secondary device 110 deletes 630 the data item from the send queue on the secondary device 110. At this point, since the outbound data item has been successfully sent, the secondary device 110 makes no further attempts. If the secondary retry module 514 determines 622 that the host computer 102 has not successfully sent the outbound data item, the secondary retry module 514 generates 624 a new secondary send event for the outbound data item.

If the verification module 512 determines 626 that this new secondary send event is successful, the send module deletes 630 the item from the send queue. If the new secondary send event is unsuccessful, the process of determining whether the host computer 102 has sent the outbound data item, making an additional attempt to send the outbound data item, and determining whether the additional attempt is successful repeats.

As shown in steps 610, 612, and 614, a similar process occurs on the host computer 102. Similar to that described in connection with the secondary device 110, the retry module 314 makes additional attempts at sending the outbound data item if the first attempt on the host computer 102 fails. In one embodiment, the retry module 314 generates a new send event so long as the confirmation module 312 has not received the confirmation notification from the secondary device 110 that indicates that the secondary device 110 successfully sent the outbound data item over a second network connection 114. In an alternative embodiment, the retry module 314 requests an update prior to generating a new send event.

If the secondary device 110 has successfully sent the outbound data item, the synch module 316 marks the outbound data item as sent on the host computer 102. If the secondary device 110 has not yet successfully sent the outbound data item, the retry module 414 generates 612 a new send event for the outbound data item. If this new send event also fails, the process of verification and resending repeats until either the host computer 102 or the secondary device 110 send the outbound data item. Once the data item is successfully sent, the synch module 316 provides the appropriate notification and the outbound data item is designated as sent.

Figure 7:
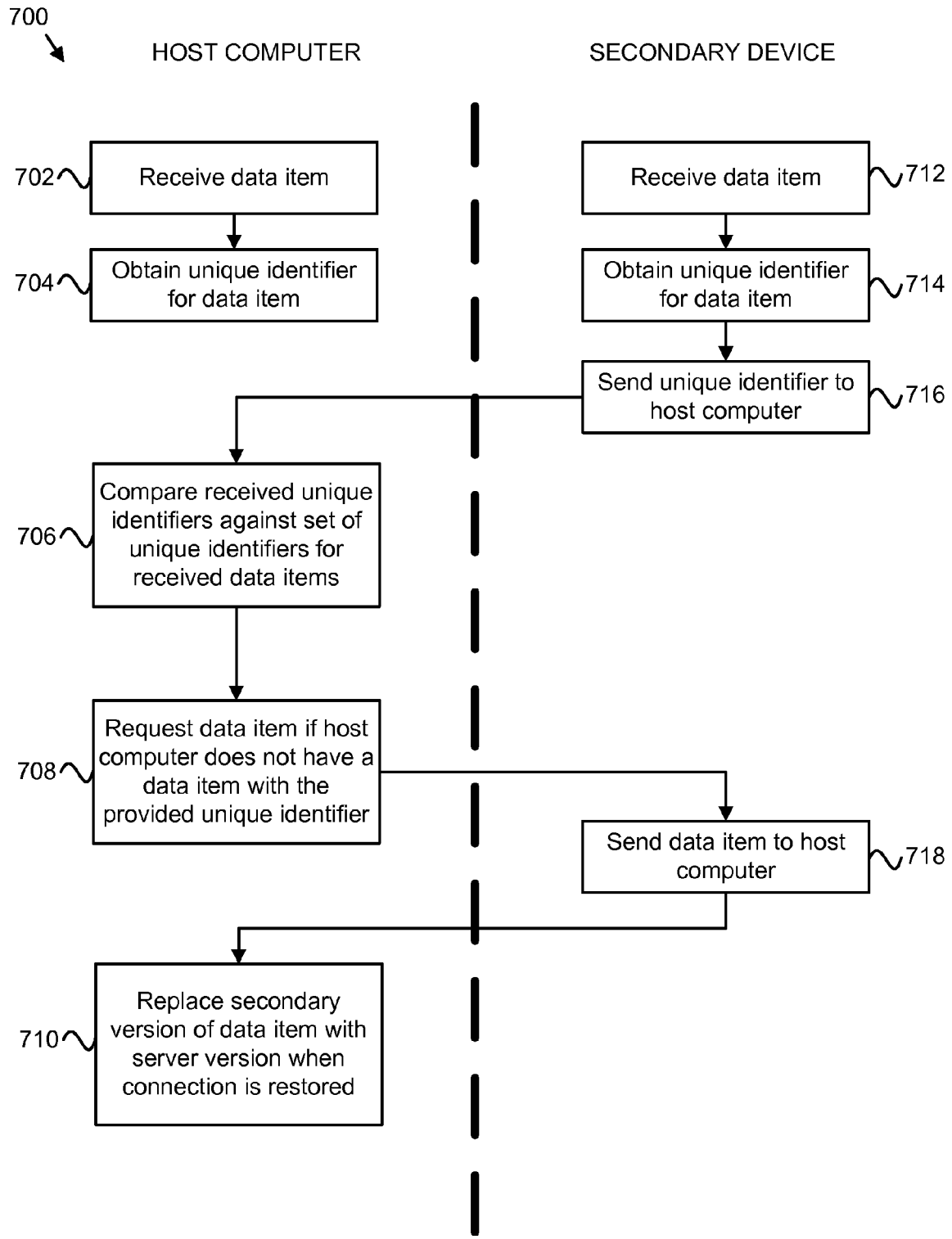
FIG. 7 is a schematic flow chart diagram illustrating one embodiment of a method for inbound data synchronization in accordance with the present invention.

FIG. 7 shows an exemplary flow chart illustrating one embodiment of a method 700 for receiving inbound data items in accordance with the present invention. As in FIG. 6, the left side of the flow chart represents activity on the host computer 102 and the right side represents activity on the secondary device 110.

The method 700 begins with the host computer 102 receiving 702 an inbound data item. The inbound module 318 obtains 704 a unique identifier for the inbound data item as described above. The secondary device 110 similarly receives 712 inbound data items and obtains 714 unique identifiers for each inbound data item. The secondary device 110 then sends 716 the unique identifier to the host computer 102.

In one embodiment, the inbound module 318 requests one or more unique identifiers for data items received by the secondary device 110. The secondary device 110 may also push the unique identifiers to the host computer 102. The inbound module 318 may define what the unique identifier is and request the identifying data for inbound data items on the secondary device 110. For example, the inbound module 318 may request the day/time/sent mail header and the subject line for emails received by the secondary device 110. In such an embodiment, the secondary device 110 needs only limited intelligence with regards to synchronizing inbound data items so long as it can respond to requests for data from the host computer 102.

The inbound module 318 compares 706 the unique identifiers received from the secondary device 110 with the unique identifiers for inbound data items received by the host computer 102. If the secondary device 110 has inbound data items that the host computer 102 does not, the inbound module 318 requests 708 those data items. In one embodiment, the inbound module 318 requests data items corresponding to unique identifiers for inbound data items received by the secondary device 110 but not by the host computer 102.

In response, the secondary device 110 sends 718 the inbound data items to the host computer 110. As a result, the host computer 102 is kept current as to inbound data items even if it does not have an active network connection so long as the secondary device has an active network connection. In addition, the present invention ensures that only those items that were not received by the host computer 102 are sent to the host computer 102 by the secondary device 110. This reduces instances of duplication and makes the system more manageable and stable.

In one embodiment, the inbound module 318 marks those inbound data items that have been received from the secondary device 110 for replacement when the host computer 102 receives those inbound data items directly. This may be accomplished, in one embodiment, by keeping a table of unique identifiers for those inbound data items received from the secondary device 110. Upon receipt of a data item, the inbound module 318 derives a unique identifier and compares it with those in the table. If the unique identifier is found in the table, that particular inbound data item is replaced and the entry is removed from the table.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory computer readable storage medium comprising a computer readable program for data synchronization, wherein the computer readable program when executed on a computer causes the computer to:
    generate an email send event on a host computer that sends an email to a recipient over a first network connection connecting the host computer to a first network;
    copy the outbound data of the email send event from the host computer to a secondary device that is separate from the host computer in response to generating the email send event;
    monitor the email send event;
    notify the secondary device of a successful send event on the host computer in response to the host computer sending the email to the recipient over the first network connection;
    notify the secondary device of a failed send event on the host computer in response to the host computer failing to send the email to the recipient over the first network connection, wherein the secondary device generates a secondary send event from the outbound data that attempts to send the email to the recipient over a second network connection in response to receiving the notification of the failed send event;
    communicate a confirmation notification to the host computer in response to the secondary device successfully sending the email over the second network connection; and
    notify the secondary device to delete the outbound data copied to the secondary device in response to the host computer sending the email to the recipient over the first network connection.

2. The non-transitory computer readable storage medium of claim 1, further comprising generating a new email send event in response to one of the secondary device failing to successfully send the email, a change in the state of the host computer, and a change in the state of the network connection of the host computer.

3. The non-transitory computer readable storage medium of claim 2, further comprising causing the host computer to verify that the secondary device failed to successfully send the email prior to generating the new send event.

4. The non-transitory computer readable storage medium of claim 1, further comprising causing the host computer to designate the email as sent in response to one of the host computer sending the email over the first network connection and the secondary device sending the email over the second network connection.

5. The non-transitory computer readable storage medium of claim 1, wherein the secondary device is communicatively connected to the host computer through a card that is separate from and directly connected to the host computer, and wherein the card is communicatively connected to the secondary device by a Bluetooth connection.

6. The non-transitory computer readable storage medium of claim 5, wherein the card sends data to the secondary device and receives data from the secondary device in response to the host computer being in a powered-down state.

7. The non-transitory computer readable storage medium of claim 1, further comprising causing the host computer to:
    determine whether the secondary device has received inbound data items that the host computer has not received over the first network connection; and
    receive from the secondary device the inbound data items that the host computer has not received.

8. The non-transitory computer readable storage medium of claim 7, wherein determining whether the secondary device has received inbound data items that the host computer has not received further comprises:
    obtaining a set of unique identifier for inbound data items sent to the host computer over the first network connection;
    obtaining a set of unique identifier for inbound data items sent to the secondary device over the second network connection; and
    receiving from the secondary device the inbound data items having a unique identifier that is not in the set of unique identifiers for inbound data items of the host computer.

9. The non-transitory computer readable storage medium of claim 1, wherein the secondary device is communicatively connected to the host by a Bluetooth connection.

10. The non-transitory computer readable storage medium of claim 1, wherein the computer readable program is executed on one of the host computer and a card.

11. The non-transitory computer readable storage medium of claim 1, the computer further:
    resending the email on the secondary device in response to the secondary send event failing and the secondary device lacking the success notification from the host computer; and
    resending the email on the host computer transparently to the user in response to lacking the notification from the secondary device.

12. An apparatus comprising:
    a computer-readable storage media storing computer readable programs;
    a processor executing the computer readable programs, the computer readable programs comprising:
        an outbound module that generates an email send event on a host computer that sends an email to a recipient over a first network connection connecting the host computer to a first network, copies the outbound data of the email send event from the host computer to a secondary device that is separate from the host computer in response to generating the email send event, monitors the email send event, and notifies the secondary device of a successful send event on the host computer in response to the host computer sending the email to the recipient over the first network connection;

the outbound module that further notifies the secondary device of a failed send event on the host computer in response to the host computer failing to send the email to the recipient over the first network connection, wherein the secondary device generates a secondary send event from the outbound data that attempts to send the email to the recipient over a second network connection in response to receiving the notification of the failed send event;

a confirmation module that communicates a confirmation notification to the host computer in response to the secondary device successfully sending the email over the second network connection; and a confirmation module that notifies the secondary device to delete the outbound data copied to the secondary device in response to the host computer sending the email to the recipient over the first network connection.

13. The apparatus of claim 12, the synch module further configured to designate the email as sent on the host computer in response to the confirmation module receiving a confirmation notification from the secondary device in response to the secondary device successfully executing the secondary send event such that the email is sent to the recipient over the second network.

14. The apparatus of claim 12, the apparatus further comprising an inbound module configured to:
  obtain a set of unique identifiers for one or more inbound emails sent to the host computer;
  compare one or more unique identifiers for one or more inbound emails sent to the secondary device with the set of unique identifiers for the one or more inbound emails sent to the host computer; and
  receive from the secondary device inbound emails received by the secondary device that have a unique identifier that is not in the set of unique identifiers for inbound emails of the host computer.

15. The apparatus of claim 12, wherein the retry module generates the new send event further in response to one or more of:
  the host computer detecting a connection to a network;
  the host computer entering a powered on state; and
  the completion of a predetermined wait time.

16. The apparatus of claim 12, the apparatus further comprising:
  a secondary retry module resending the email on the secondary device in response to the secondary send event failing and the secondary device lacking the success notification from the host computer; and
  a retry module resending the email on the host computer transparently to the user in response to lacking the notification from the secondary device.

17. A system comprising:
  a host computer comprising:
    a first network connection communicatively connecting the host computer to a first network;
    a first synchronization apparatus comprising:
      an outbound module that generates an email send event on the host computer that sends an email to a recipient over the first network, copies the outbound data of the email send event to a secondary device in response to generating the email send event, and monitors the email send event;
      the outbound module that further notifies the secondary device of a failed send event on the host computer in response to the host computer failing to send the email to the recipient over the first network;
      a confirmation module that notifies the secondary device to delete the outbound data copied to the secondary device in response to the host computer sending the email to the recipient over the first network connection and receives a confirmation notification from the secondary device in response to the secondary device successfully sending the email over a second network;
      a retry module that resends the email on the host computer transparently to the user in response to the confirmation module lacking the confirmation notification for the email; and
      a synch module that provides the secondary device with a success notification in response to a successful send of the email by the host computer;
  the secondary device comprising:
    a second network connection communicatively connecting the secondary device to the second network;
    a support apparatus comprising;
      a send module that generates a secondary send event for the email over the second network in response to receiving notification of a failed send event on the host computer from the outbound module;
      a verification module that sends the confirmation notification to the host computer in response to the secondary device successfully sending the email over the second network;
      a secondary retry module configured to resend the email on the secondary device in response to the secondary send event failing and further in response to the secondary device lacking the success notification.

18. The system of claim 17, wherein the retry module is further configured to continue resending the email until one of a successful send event of the email by the host computer and the confirmation module receiving the confirmation notification.

19. The system of claim 17, further comprising a card configured to communicatively connect to the host computer through a direct connection and to communicatively connect to the secondary device.

20. The system of claim 17, wherein the card sends data to the secondary device and receives data from the secondary device in response to the host computer being in a powered-down state.

* * * * *